UNITED STATES PATENT OFFICE.

ROBERT H. COLLYER, OF CAMDEN, NEW JERSEY.

IMPROVEMENT IN PREPARING PAPER-PULP FROM BEET AND OTHER REFUSE.

Specification forming part of Letters Patent No. 18,389, dated October 13, 1857.

*To all whom it may concern:*

Be it known that I, ROBERT HANHAM COLLYER, of Camden, in the State of New Jersey, in the United States of America, have invented an improved mode of manufacturing paper by the application and use as material of the prepared residue of beet-root, mangel-wurzel, and other species of the genus *Beta* left in the process of sugar-making and distillation, of which the following is a specification.

The invention consists in the preparation of said residue for paper-making material in such a manner that the glutinous, albuminous, gelatinous, and other proteine qualities it contains shall be developed, preserved, and brought into an active state and rendered useful, and in the application and use of said residue when prepared, in combination with other materials, to form a pulp convertible by known modes into paper, papier-maché, mill-board, and other paper manufactures. This residue has heretofore been tried for the same purpose, but with little or no success, especially when pressed, for the reason that it was used under such conditions as to render these qualities comparatively useless and inactive, or has undergone such treatment previous to use as to remove them, thus destroying properties which I consider most essential when the residue is employed for making paper. The development and employment of the cellulose, starchy, gummy, albuminous, gelatinous, and other proteine substances in a state of coagulation and under certain conditions of insolubility give to the material a greatly-increased value, for the cohesive and sizing properties brought into use aid and strengthen not only the fiber of the residue, but give body and tenacity to other materials, some of which could not otherwise be employed with advantage. The use of the residue, if these properties have not been washed away or otherwise removed or destroyed by the use of caustic alkalies, or by any process subsequent to that of making sugar or spirit—such as a subsequent macerating and re-pressing, or injured by fermentation—will enable the manufacturer to dispense with the use of other size and avoid the necessity—as when gelatine or animal size is used—of passing the paper through a subsequent process in another machine to be sized, and will also give strength and tenacity, as above mentioned, to the article. In consequence of the whole mass of the pulp being permeated, instead of the surface covering, it is, from being more compact, solid, and elastic, in a condition not to crack. Therefore, for the same reason it will resist damp and moisture. From this cohesive property much larger proportions than in the usual modes of ordinary materials in combination with it can be employed. The paper will be less liable to injury from insects or decomposition of the size than when animal substances are employed.

The residue may be found sufficiently prepared and the albumino-mucilaginous substance coagulated and preserved in a sufficient degree for use for some descriptions of paper, when left by those processes of sugar-making and distillation where the best root is boiled or steamed and macerated; but as this has never to my knowledge been employed in this state as paper material I claim to be the first inventor of its use and employment as such.

When the other modes of distillation and sugar-making have left the residuum in a raw and crude state with the proteine substances soluble, comparatively dormant, without strength or cohesive power, before it is fit to be used, it is necessary to develop, fix, and render permanent these properties.

As the residue must be used throughout the year, and as the distilleries and sugar-factories are in operation only about seven months, to preserve it from decomposition the residue should be dried, in order to be used during the interval. I will therefore begin my description of the mode of preparing it for use from that state. It should first be soaked in sufficient amount of cold water to allow the residue to swell or absorb the maximum amount of humidity. This will require from eighteen to twenty-four hours. It should then be boiled or steamed in a suitable receptacle, or treated in the same manner as is employed in the ordinary malting process—or, in other words, subjected to the action of active humid caloric acid at a temperature of from 190° to 212° Fahrenheit—for a time sufficient to coagulate the albumino-mucilaginous properties, which is generally effected in about an hour, depending on the quality operated on. While boiling add from two per cent. to four per cent. of carbonate of soda, or, in lieu thereof, from one and a half to two per cent. of sulphuric acid. I prefer the addition of the acid in those descriptions of paper which are required to be solid and compact. The sulphuric acid should be added and well mixed in the pulpy condition of the residue. It communicates tenacity and compactness by producing a coherence of the cellulose tissue, and also brings into an active glutinous state the proteine compounds. The residue is now prepared and ready to be mixed with other materials in any proportion required. These albumino-mucilaginous or proteine substances are found to exist in one hundred parts of the dried residue in the proportion of about thirty-four parts cellulose, and woody tissue fifty-six parts, and ten parts of fixed salts of potassa, soda, silica, and some earthy matters. These salts have been in a great measure extracted in that process of sugar-making where the beet-root has been macerated.

In order to make white paper, the prepared residue—that is, that in which the albumino-mucilaginous substances have been coagulated and preserved—should be first steeped in water, and if any saccharine or other matter than the proteine substances and the fiber of the residue exist it should be removed. After boiling with from two per cent. to four per cent. of carbonate of soda (soda-ash) it is ready to be bleached by submitting it to a bath of chloride of lime or any other bleaching process. It is then ready to be mixed with bleached cotton or linen rags in the proportion of from ten per cent. to fifty per cent., or more, in accordance with the particular kind of paper required.

The extraordinary tendency which the cellulose, starchy, and the proteine substances have to enlarge when exposed to heat and moisture renders them very valuable for giving strength to either material, especially to cotton, which is deficient in these properties. When thus mixed each fiber of the cotton becomes cylindrical and thick, and attains the strength of hemp and flax, and no longer loses its shape through pressure. A similar improvement is evident when it is combined with other materials. A proportion of ten per cent. of this prepared residue, with the other usual materials, makes tougher and more flexible paper. Twenty-five per cent. renders packing-paper sufficiently water-proof that no other sizing will be required. Fifty per cent. will produce paper nearly or quite as strong as parchment, and which in very thin sheets will preserve articles packed in it from damp.

Strong paper, card-board, &c., can be made from fifteen per cent. of prepared residue and twenty-five per cent. of cotton; also, of fifty per cent. of prepared residue, forty per cent. of raw residue, and ten per cent. of common sawdust. Cut straw, hay, &c., may be used. Fifty per cent. of prepared residue and thirty per cent. of fine-cut straw, by weight, will produce strong packing-paper, as also fifty per cent. of white sawdust, thirty per cent. of prepared residue, and twenty per cent. of cotton or cotton rags. Where the object is to give a glazed surface to the paper add one-half per cent. to one per cent. more sulphuric acid. In fine, every modification and proportion of materials resorted to for producing paper must be governed and be subordinate to the hardness, suppleness, and toughness required. If too large a proportion of prepared residue is used—say, over seventy-five per cent.—great difficulty will be experienced in its evaporation on the drying-cylinders in consequence of the impermeable nature of the proteine substances when coagulated, as before described.

The principal and especial value of the beet-root residue after distillation or the making of sugar as a paper-making material depends on the tenaceous, cohesive, agglutinating, and sizing qualities of the albumino-mucilaginous substances. It is these which I desire to preserve intact—that is, in such an active state as to communicate strength, elasticity, and sizing to the paper made therewith.

Hitherto these valuable substances have been lost by being removed by pressure, washed away, or destroyed by acetic fermentation or the use of caustic alkalies. In fine, every means has been resorted to to get rid of these very substances which I take every means to preserve.

It must be observed that acidulous or acetic fermentation destroys the proteine substances. They are also nearly all dissolved by water in the crude or incoagulated state; hence the absolute necessity of avoiding all actual washing or pressing prior to the preparation of the residue, as before described. The acetic fermentation would soon take place from the moist state in which the residue is left, after distillation or sugar-making, unless prevented. For this purpose, as well as to render it less dangerous from heating and less inconvenient for transportation, it should be desiccated at not less than 100° Fahrenheit; or it may be preserved by long boiling in water. This last, however, will not be found convenient when the substance has to be transported to distant paper-factories, as after boiling it occupies much more space and cannot be repressed.

For making brown and white paper and other paper manufactures I do not mean to confine myself to the combinations and proportions above stated, but claim the exclusive use and employment for making paper and paper manufactures, in any combination or proportion whatsoever, of the residue prepared so as to retain and preserve the albumino-mucilaginous substance, as before described, or in any other manner substantially the same, of beet-root, mangel-wurzel, and other species of the genus *Beta* left after the sugar-making and distilling processes have extracted the saccharine matter.

ROB. H. COLLYER.

Witnesses:
JOHN T. PITMAN,
F. L. CAMPBELL.